United States Patent [19]

Takada

[11] 4,259,698

[45] Mar. 31, 1981

[54] SPEED AND PHASE SERVO CONTROL APPARATUS

[75] Inventor: Shinji Takada, Yokohama, Japan

[73] Assignee: Sony Corporation, Tokyo, Japan

[21] Appl. No.: 15,106

[22] Filed: Feb. 26, 1979

[30] Foreign Application Priority Data

Feb. 27, 1978 [JP] Japan .................................. 53-21732

[51] Int. Cl.³ ............................................. G11B 21/02
[52] U.S. Cl. ...................................... 360/70; 360/75; 318/314
[58] Field of Search ....................... 360/70, 73, 75, 10, 360/11, 77; 318/314, 592, 594, 606, 607, 608

[56] References Cited

U.S. PATENT DOCUMENTS

| | | | |
|---|---|---|---|
| 3,564,368 | 2/1971 | Kelling | 318/314 |
| 3,643,012 | 2/1972 | Clark et al. | 360/70 |
| 3,686,469 | 8/1972 | Clark et al. | 360/70 |
| 3,836,756 | 9/1974 | Yammoto et al. | 360/70 X |
| 3,849,795 | 11/1974 | Koda et al. | 360/73 |
| 3,900,796 | 8/1975 | Rose | 360/73 X |
| 3,900,890 | 8/1975 | Eibner | 360/73 |
| 3,946,293 | 3/1976 | Feld | 318/314 X |

FOREIGN PATENT DOCUMENTS

2152136 4/1973 France .
2344921 10/1977 France .

*Primary Examiner*—Bernard Konick
*Assistant Examiner*—Donald McElheny, Jr.
*Attorney, Agent, or Firm*—Lewis H. Eslinger; Alvin Sinderbrand

[57] ABSTRACT

Servo control apparatus for controlling the speed and phase of a driven member. Reference signals, having a frequency determinative of the speed at which the member is driven, are compared to actual speed-representing signals in a servo loop, whereby the member is driven at the speed determined by the reference signals. An actual position-representing signal, representing the position, or phase, of the driven member, is derived. A window pulse generator generates window pulses corresponding to desired positions of the driven member. The occurrence of these position-representing signals within the duration of the window pulses is detected. A frequency modulating circuit modulates the frequency of the reference signals if the position-representing signals occur outside the window pulses, so as to adjust the speed and position, or phase, of the driven member until this member is driven such that its actual positions correspond to the desired positions. In accordance with a further aspect of this invention, the phase of the reference signals is adjusted such that the position-representing signals occur at a predetermined location within each window pulse. The driven member can be a rotary transducer or a movable record medium in, for example, a video signal recording/reproducing system.

28 Claims, 36 Drawing Figures

SPEED AND PHASE SERVO CONTROL APPARATUS

BACKGROUND OF THE INVENTION

This invention relates to servo control apparatus and, more particularly, to such apparatus which finds ready application in a video signal recording/reproducing system, whereby the driven member, which may be a rotary transducer or the movable record medium, has its speed and phase controlled in synchronism with the horizontal and vertical synchronizing signals included in the video signal.

In a video signal recording/reproducing system, such as a video tape recorder (VTR), a transducer, such as a rotary magnetic head, scans the record medium, such as magnetic tape, as the medium is moved. In the VTR, video signals are recorded on the head in parallel, skewed record tracks; and these video signals subsequently are reproduced to result in a corresponding video picture. For improved quality in a VTR, either for use in television broadcast applications or for home entertainment, the rotation of the magnetic head and/or the movement of the tape should be synchronized with external synchronizing signals. That is, and with respect to the rotary head, for example, the rotational speed of the head, as well as its phase, or position, should be synchronized. With respect to the tape, which generally is driven by a capstan, the speed and position of that tape likewise should by synchronized.

In one type of synchronizing control apparatus, known as servo control apparatus, for controlling the rotary speed and position of the magnetic head, the speed is controlled by one servo loop and the position is controlled by another. For example, a frequency generator, such as a magnetic-toothed wheel and a magnetic pick-up, is provided on or driven with the shaft which drives the rotary magnetic head. The frequency of the signal produced by this frequency generator is a function of the rotary speed of the head. This frequency is compared with a reference frequency, such as the frequency of a signal derived from the horizontal synchronizing signal included in a video signal, and any difference therebetween is used to adjust the speed at which the head is driven. In the position-control servo loop, a position pulse generator, such as a magnetic element secured to the rotary head drive-shaft and a magnetic pick-up, generates a position pulse each time that the head rotates into a predetermined position with respect to the tape, such as into initial magnetic contact with the tape. The position pulse is phase-compared to the vertical synchronizing signal included in the video signal; and any phase difference therebetween is used to briefly change the speed of the head so as to adjust its phase. The two servo loops cooperate first by adjusting the phase of the rotary head to within a predetermined desired range, and then to control the rotary speed while maintaining the phase within this desired range.

However, since the speed and phase control of the aforementioned servo control apparatus requires the use of two separate and independent servo loops, this apparatus is of relatively complex construction. Furthermore, if the gain of the phase control servo loop is large so as to limit the acceptable range of desired position, hunting often occurs whereby the phase of the rotary head overshoots and undershoots, i.e., hunts, about its desired, limited range. Conversely, if the gain of the phase control servo loop is reduced so as to avoid such undesired hunting, it may require a long time delay until proper phasing, or positioning, of the head is attained. These factors must be taken into account in designing servo control apparatus, thus making the design of such apparatus quite difficult.

OBJECTS OF THE INVENTION

Therefore, it is an object of the present invention to provide improved servo control apparatus which avoids the aforenoted problems attending prior art apparatus, and which is of relatively simple construction, low in cost and small in size.

Another object of this invention is to provide improved servo control apparatus for controlling the speed and position of a driven member, and wherein the positioning of that member is attained rapidly within a desired range without undesired overshooting and undershooting of that range; and without requiring an undesired long delayed time in attaining the proper positioning of the driven member.

A further object of this invention is to provide improved servo control apparatus which utilizes digital techniques for high accuracy and speed.

An additional object of this invention is to provide servo control apparatus for use in a video signal recording/reproducing system of the type wherein a rotary transducer scans across a movable record medium, and wherein the position of the transducer relative to the medium is synchronized with the vertical synchronizing signal of the video signal.

Yet another object of this invention is to provide servo control apparatus of the aforedescribed type wherein the position of the head or medium is controlled to be within a predetermined limited range at the time of occurrence of the vertical synchronizing signal.

A still further object of this invention is to provide servo control apparatus of the aforementioned type wherein the position of the head or medium, once within the predetermined range, is adjustable so as to correspond to a predetermined location at the time of occurrence of the vertical synchronizing signal.

Various other objects, advantages and features of the present invention will become readily apparent from the ensuing detailed description, and the novel features will be particularly pointed out in the appended claims.

SUMMARY OF THE INVENTION

In accordance with this invention, servo control apparatus is provided for controlling a driven member, such as a rotary transducer or a movable record medium used in a video signal recording/reproducing system. Signals representing the actual speed at which the motor is driven are derived, and these signals are compared to a source of reference signals having a frequency determinative of the speed at which the member is to be driven. The reference signals may be synchronized with the horizontal and vertical synchronizing signals included in a video signal. A single servo loop is provided for driving the member, the speed at which the member is driven being varied in accordance with any phase differential between the reference signals and the speed-representing signals. Signals representing the actual position of the driven member also are derived; and these position-representing signals are compared to window pulses which correspond to desired positions of the driven member. In the event that the position-representing signals occur outside the window pulses, the frequency of the reference signals is modulated so as to adjust the speed and position of the driven member until the actual position of that member corresponds to the desired position. In accordance with one aspect of this invention, the phase of the reference signals is adjusted once the position-representing signals occur within the window pulses, so as to further adjust the position of the driven member, whereby the position-representing signals occur at precise, predetermined locations within the window pulses. In this manner, the position of the rotary transducer relative to the record medium is synchronized to be at a desired location at the time of occurrence of, for example, the vertical synchronizing signal of the video signal.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
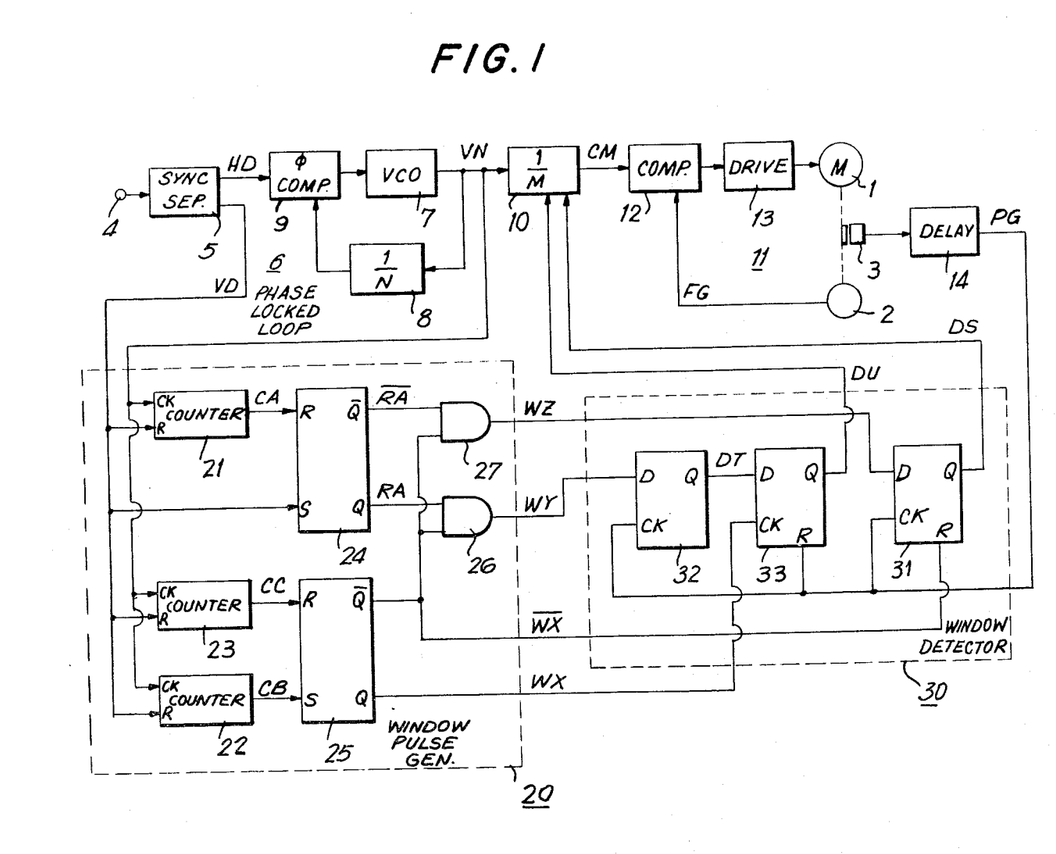
FIG. 1 is a partial block, partial logic diagram of one embodiment of the present invention.

Referring now to the drawings, wherein like reference numerals are used throughout, FIG. 1 illustrates one embodiment of servo control apparatus in accordance with the present invention, which apparatus is used, for example, to control the position of a rotary transducer, such as one or more rotary magentic heads, used in a video recording/reproducing system, such as a VTR. For the purpose of explanation, the servo control apparatus is described in the environment of a VTR. However, it should be readily apparent that the present invention can be used to control other members which are driven in synchronism with reference signals such that the phase of the driven member is controlled. FIG. 1 illustrates a controllable motor 1 which is connected via a drive shaft to one or more magnetic heads and which serves to rotate those heads at a controllable speed. A frequency generator 2 is mechanically coupled to the drive shaft and is adapted to produce a signal whose frequency represents the actual rotary speed of motor 1 and, thus, the actual rotary speed of the driven heads. As an example, frequency generator 2 may comprise a magnet-toothed wheel which rotates with the drive shaft, and a magnetic pick-up which produces a pulse in response to the passage of each magnetic tooth therepast. A number of such pulses is produced for each rotation of the drive shaft. Also secured to the drive shaft is a position pulse generator 3 which is adapted to generate a pulse representing the actual position of the heads as such heads are rotated. As one example thereof, position pulse generator 3 may comprise a magnetic element secured at a predetermined angular location on the drive shaft and a magnetic pick-up which generates a pulse ach time the magnetic element rotates therepast. Depending upon the position of this magnetic element relative to the heads, position pulse generator 3 generates a position pulse that is disposed at a particular phase when the heads rotate to a predetermined position.

The apparatus illustrated in FIG. 1 further includes a synchronizing signal separator 5, a phase locked loop 6, a controllable frequency divider 10, a servo loop 11, a window pulse generator 20 and a window detector 30. Synchronizing signal separator 5 may comprise a conventional synchronizing signal separator circuit and is connected to input terminal 4 to receive a video signal. As is conventional, the synchronizing signal separator operates to separate the horizontal synchronizing signal HD and the vertical synchronizing signal VD from the video signal which is supplied thereto. The separated horizontal synchronizing signal HD derived from synchronizing signal separator 5 is supplied to phase locked loop 6 for locking the phase of higher frequency reference pulses VN to the phase of the separated horizontal synchronizing signal. The phase locked loop is comprised of a controllable oscillator 7, such as a voltage controlled oscillator (VCO), a frequency divider 8 and a phase comparator 9. The output of VCO 7, which comprises higher frequency pulses VN, is connected to frequency divider 8 which divides the frequency of the higher frequency pulses by a predetermined factor, such as a divider ratio N. The output of frequency divider 8 is connected to one input of phase comparator 9, this phase comparator having another input connected to receive the separated horizontal synchronizing signal HD. Depending upon the phase differential detected by phase comparator 9 between the divided pulses supplied thereto by frequency divider 8 and the horizontal synchronizing signal, an error voltage is supplied to VCO 7 to adjust the frequency of the VCO and thus bring the phase of the higher frequency pulses VN into synchronism with the phase of the horizontal synchronizing signal HD. As may be appreciated, the frequency of the pulses generated by VCO 7 should be N times the horizontal synchronizing frequency such that phase comparator 9 is supplied with signals of equal frequency.

The output of phase locked loop 6, that is, the higher frequency pulses VN generated by VCO 7, is connected to controllable frequency divider 10 and, additionally, to window pulse generator 20. Controllable frequency divider 10 may comprise a plural-stage counter and is adapted to divide the frequency of the pulses VN supplied thereto by a predetermined facctor M. This factor M may be increased to (M+1) or decreased to (M−1), depending upon particular ratio control signals supplied thereto. For this purpose, controllable frequency divider 10 includes a first control input which, when supplied with a ratio control pulse DU, reduces the divider ratio from 1/M to 1/(M−1). Controllable frequency divider 10 includes another control input for receiving a ratio control pulse DS, whereby the dividing ratio of the frequency divider is increased from 1/M to 1/(M+1). These ratio control pulses are generated by window detector 30, to be described.

The output of controllable frequency divider 10 constitutes frequency-divided reference pulses CM, which are supplied to servo loop 11. The servo loop includes a phase comparator 12, a drive circuit 13, motor 1 and frequency generator 2. The frequency-divided reference pulses CM are supplied to phase comparator 12 together with the signal FG generated by frequency generator 2. It may be appreciated that the frequency of the signal FG represents the actual speed of motor 1 and, therefore, will be referred to herein as the speed-representing signal. Servo loop 11 is adapted to adjust the speed of motor 1 such that this motor is driven at the speed determined by frequency-divided reference pulses CM. In this regard, phase comparator 12 compares the phase of the frequency-divided reference pulses to the phase of the speed-representing signal, and any phase differential therebetween results in an error voltage which is applied to drive circuit 13. The drive circuit controls the speed of motor 1 in accordance with the magnitude and polarity of the error voltage. Thus, the speed of motor 1 is controlled to be equal to that determined by the frequency of the frequency-divided reference pulses CM.

Window pulse generator 20 is adapted to generate a desired window pulse having a duration which establishes the range for the proper positioning of motor 1. That is, and as will be described in greater detail, this is the desired range during which a position pulse PG generated by position pulse generator 3 should occur. Window pulse generator is comprised of counters 21, 22 and 23, bistate circuits 24 and 25, and AND gates 26 and 27. Each of counters 21, 22 and 23 includes a reset input connected to synchronizing signal separator 5 to receive the separated vertical synchronizing signal VD. Each counter also includes a clock input CK connected to the output of phase locked loop 6 to receive the higher frequency reference pulses VN generated by VCO 7. Each counter, after being reset to an initial count, such as a count of zero, is adapted to count each pulse supplied to the clock input CK thereof. Counter 21 generates an output pulse CA after a predetermined number of higher frequency pulses VN have been counted thereby. For example, if it is known that a certain number x of reference pulses VN are generated during each field interval of the video signals, that is, during the interval between adjacent vertical synchronizing signals VD, counter 21 is adapted to count x/2 of these pulses. Hence, output pulse CA is generated approximately midway between adjacent vertical synchronizing signals VD. Counter 22 is adapted to count another predetermined number of higher frequency reference pulses VN. As a numerical example, this counter counts 1,043 such pulses to produce an output pulse CB. Counter 23 also is adapted to count still another predetermined number of higher frequency reference pulses VN, for example, seven such pulses, to produce an output pulse CC.

Bistate circuits 24 and 25 each may comprise a conventional R-S flip-flop circuit. The reset input R of flip-flop circuit 24 is connected to counter 21 for receiving output pulse CA therefrom, and the set input S of this flip-flop circuit is connected to the output of synchronizing separator circuit 5 to receive the separated vertical synchronizing signal VD. Flip-flop circuit 25 has its reset input R connected to the output of counter 23 to receive the output pulse CC therefrom, and its set input S connected to the output of counter 22 to receive the output pulse CB. The $\overline{Q}$ output of flip-flop circuit 25 is connected in common to respective inputs of AND gates 26 and 27. The other input of AND gate 26 is connected to the $\overline{Q}$ output of flip-flop circuit 24, and the other input of AND gate 27 is connected to the Q output of flip-flop circuit 24. As will be explained, flip-flop circuit 25 is adapted to generate the desired window pulse WX, which is provided at the Q output thereof, and the complementary window pulse $\overline{WX}$ is obtained at its $\overline{Q}$ output. AND gates 26 and 27 are adapted to generate additional window pulses, referred to herein as a delayed window pulse WY and an advanced window pulse WZ, respectively. The delayed window pulse is produced for a time duration following the desired window pulse WX, and thus is designated the delayed window pulse; and the advanced window pulse is produced for a time duration preceding the desired window pulse, and thus is designated the advanced window pulse. The desired window pulse WX and its complement $\overline{WX}$, together with delayed window pulse WY and advanced window pulse WZ are supplied to window detector 30.

Window detector 30 is adapted to detect when the position pulse PG generated by position pulse generator 3 occurs within the desired window pulse. Indications are provided when this position pulse occurs during the duration of the delayed window pulse and also during the duration of the advanced window pulse. The window detector is comprised of bistate circuits 31, 32 and 33, each of which is illustrated herein as being a timing pulse controlled flip-flop circuit, such as a D-type flip-flop circuit. Flip-flop circuit 31 senses when the position pulse occurs during the advanced window pulse; and flip-flop circuit 33 senses when the position pulse occurs within the delayed window pulse WY. Flip-flop circuit 31 has its data input D connected to AND gate 27 to receive the advanced window pulse WZ therefrom, and its clock input CK connected via a delay circuit 14 to the output of pulse generator 3 to receive the position pulse PG. Flip-flop circuit 31 additionally includes a reset input R connected to the $\overline{Q}$ output of flip-flop circuit 25 to receive the complement of the desired window pulse $\overline{WX}$. The Q output of flip-flop circuit 31 is connected to a control input of variable frequency divider 10 to supply the ratio control pulse DS thereto.

Flip-flop circuit 32 has its data input D connected to AND gate 26 to receive the delayed window pulse WY therefrom. The clock input CK of this flip-flop circuit is connected to receive the position pulse PG supplied from position pulse generator 3 via delay circuit 14. The Q output of flip-flop circuit 32 is connected to the data input D of flip-flop circuit 33, this flip-flop circuit having its clock input CK connected to the Q output of flip-flop circuit 25 to receive the desired window pulse WX therefrom. The reset input of flip-flop circuit 33 is connected to receive the position pulse PG supplied from position pulse generator 3 through delay circuit 14. The Q output of flip-flop circuit 33 is connected to the other control input of controllable frequency divider 10 to supply the ratio control pulse DU thereto. Delay circuit 14 imparts a constant time delay to the generated position pulse such that, when motor 1 is driven in synchronism with the horizontal and vertical synchronizing signals, the delayed position pulse occurs in coincidence with the vertical synchronizing signal VD. Delay circuit 14 thus is provided to compensate for the particular positioning of the magnetic element, included in position pulse generator 3, on the motor drive shaft.

Figure 4A:
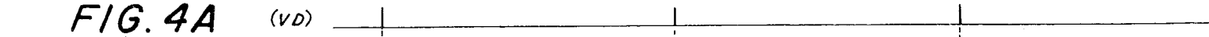
FIGS. 4A-4M are waveform diagrams which are useful in understanding the operation of the embodiment shown in FIG. 1.
Figure 4B:
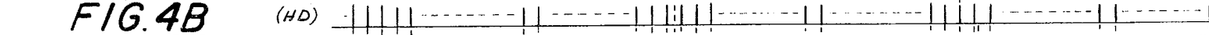
Figure 4C:
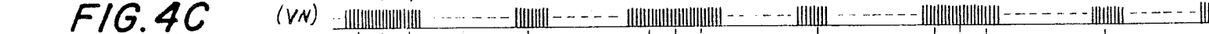

The manner in which the servo control apparatus illustrated in FIG. 1 operates now will be described with reference to the waveforms shown in FIGS. 4A–4M. FIG. 4A represents the vertical synchronizing signal VD which is separated from the video signal supplied to input terminal 4; and FIG. 4B represents the separated horizontal synchronizing signal. It is assumed that the vertical synchronizing signals define video field intervals, and that 262.5 line intervals, or horizontal synchronizing signals, are included in each field interval. It is further assumed that the frequency of the higher frequency reference pulses VN generated by VCO 7 is four times the horizontal synchronizing frequency. Thus, during one field interval, that is, during the interval between two successive vertical synchronizing signals VD, VCO 7 generates 1,050 synchronized higher frequency reference pulses VN, as shown in FIG. 4C. Servo loop 11 synchronizes the operation of motor 1 with the frequency-divided reference pulses CM produced by variable frequency divider 10. It is recalled that the frequency of signal FG, generated by frequency generator 2, is equal to the frequency of the frequency-divided reference pulses CM which are obtained at the output of divider 10. If the dividing ratio of divider 10 is represented as M, and if the frequency of the higher frequency reference pulses VN is represented as $Nf_H$, then the frequency of the position-representing signal FG should be equal to $(N/M)f_H$, wherein $f_H$ is the horizontal synchronizing frequency. Let it be assumed that motor 1 rotates at the rotary speed of $f_0$. Let it be further assumed that the number of magnetic teeth, or elements, included in frequency generator 2, is represented as G. Hence, the frequency of the position-representing signal FG may be represented as $Gf_0$. Servo loop 11 controls motor 1 such that the speed of this motor corresponds to the frequency $(N/M)f_H$ of the frequency-divided reference pulses CM. Thus, $Gf_0=(N/M)f_H$. Typical values for the NTSC system are G=75, N=4, and M=14. In accordance with these numerical assumptions, the rotary speed $f_0$ of motor 1 is equal to 60 Hz, which is equal to the field repetition rate. Of course, and as may be appreciated, one or more of the factors G, N and M may be varied in the event that the rotary speed of motor 1 is, for example, 30 Hz, or any other rotary frequency. In the assumed example wherein the rotary speed of motor 1 is 60 Hz, this motor, together with the magnetic head driven thereby, undergoes one rotation during each field interval.

Figure 4D:
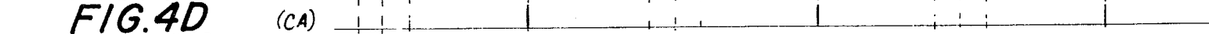
Figure 4E:
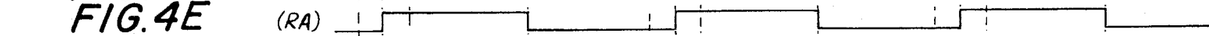
Figure 4F:
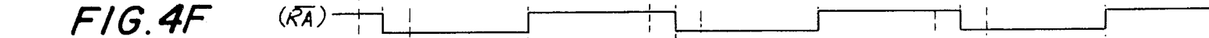

As mentiond previously, if there are x higher frequency pulses VN generated during each field interval, counter 21 counts each such pulse until the count of x/2 is obtained. In the present example, it is assumed that x=1,050. Hence, after being reset by vertical synchronizing signal VD, counter 21 counts 1,050/2, or 525 higher frequency pulses VN. When the count of 525 is reached, counter 21 generates output pulse CA, as shown in FIG. 4D. This output pulse CA occurs substantially midway between two adjacent vertical synchronizing signals VD, and is generated at the vertical synchronizing frequency. Flip-flop circuit 24 is set in response to the separated vertical synchronizing signal VD, and is reset in response to the output pulse CA to produce the pulse waveform RA at the Q output thereof, and the complementary pulse waveform $\overline{RA}$ at the $\overline{Q}$ thereof, as shown in FIGS. 4E and 4F, respectively.

Figure 4G:
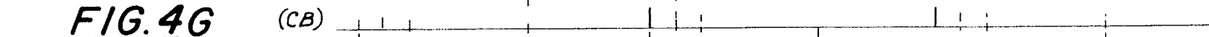
Figure 4H:
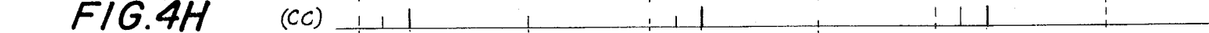
Figure 4I:
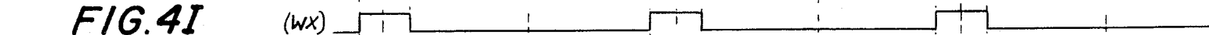
Figure 4J:
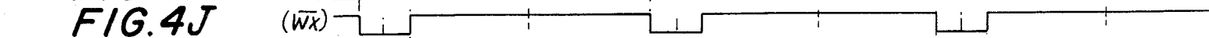

After being reset by vertical synchronizing signal VD, counter 22 counts 1,043 higher frequency reference pulses VN. Thus, and as shown in FIG. 4G, counter 22 produces the output pulse CB that leads the separated vertical synchronizing signal VD by an interval equal to seven higher frequency reference pulses VN. Counter 23, after being reset by vertical synchronizing signal VD, produces the output pulse CC after counting seven higher frequency reference pulses VN. As shown in FIG. 4H, pulse CC lags vertical synchronizing signal VD by an interval equal to seven higher frequency reference pulses VN. Flip-flop circuit 25 is set in response to pulse CB, and reset in response to pulse CC. Thus, the Q output of flip-flop circuit 25 generates the desired window pulse WX, as shown in FIG. 4I. It is seen that this desired window pulse is substantially centered with respect to the vertical synchronizing signal VD. The complement $\overline{WX}$ of the desired window pulse is produced at the $\overline{Q}$ output of flip-flop circuit 25, as shown in FIG. 4J.

Figure 4K:
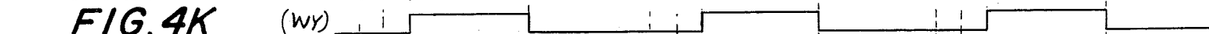

AND gate 26 produces the delayed window pulse WY when the pulse waveform RA provided at the Q output of flip-flop circuit 24 coincides with the complementary desired window pulse $\overline{WX}$, as shown in FIG. 4K. Similarly, AND gate 27 produces the advanced window pulse WZ when the pulse waveform $\overline{RA}$ (FIG. 4F) coincides with the complementary desired window pulse $\overline{WX}$, as shown in FIG. 4L.

Figures 4L, 4M:
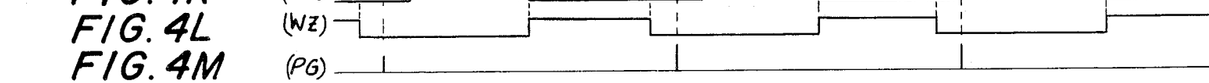

When the phase, or position, of motor 1 is synchronized with vertical synchronizing signal VD, position pulse PG, obtained at the output of delay circuit 14, occurs within the duration of the desired window pulse WX and, preferably, coincides with the separated vertical synchronizing signal VD, as shown in FIG. 4M.

The manner in which the speed control servo loop 11 is further controlled to synchronize the phase of motor 1 now will be described with reference to FIGS. 5A–5I. The vertical synchronizing signal VD, desired window pulse WX, complementary desired window pulse $\overline{WX}$, delayed window pulse WY, advanced window pulse WZ and position pulse PG, discussed previously with respect to the waveforms shown in FIG. 4, are represented in FIGS. 5A–5F, respectively. Let it be assumed, initially, that the position pulse PG occurs in advance of, i.e., prior to, desired window pulse WX. This is represented as position pulse a in FIG. 5F. This means that the magnetic head driven by motor 1 rotates into its predetermined position at a time that is too early with respect to vertical synchronizing signal VD.

Figure 5A:
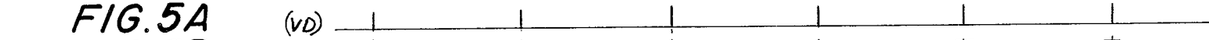
FIGS. 5A-5I are additional waveform diagrams which are useful in understanding the operation of this embodiment.
Figure 5B:
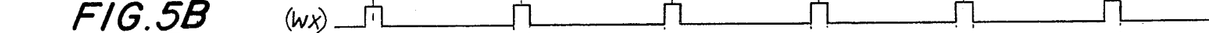
Figure 5C:
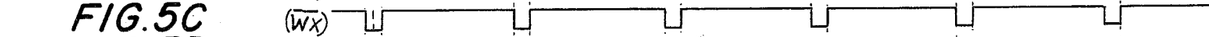
Figure 5D:
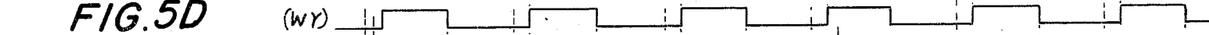
Figure 5E:
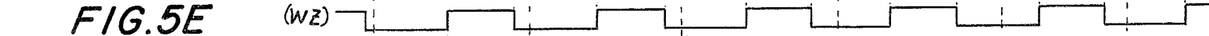
Figure 5F:
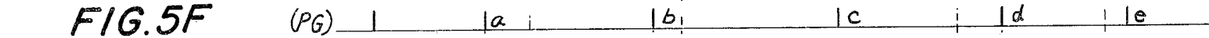
Figure 5G:
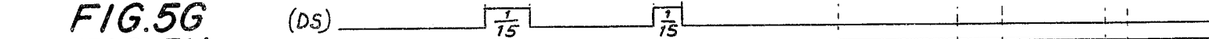

A comparison between FIGS. 5E and 5F indicates that the advanced position pulse PG occurs during the duration of advanced window pulse WZ. The position pulse thus triggers flip-flop circuit 31 to the state corresponding to that of the advanced window pulse. Hence, the Q output of flip-flop circuit 31 is provided with a binary "1", as shown in FIG. 5G. At the same time, flip-flop circuit 32 is triggered by position pulse PG to the state determined by delayed window pulse WY. Since the delayed window pulse now is at its binary "0" level, flip-flop circuit 32 remains reset.

Upon the occurrence of the positive transition in the complementary desired window pulse $\overline{WX}$, flip-flop circuit 31 is reset. Thus, and as shown in FIG. 5G, the ratio control pulse DS is produced by flip-flop circuit 31 and supplied to variable frequency divider 10. This pulse has a duration from the time of occurrence of position pulse PG to the termination of desired window pulse WX. The purpose of this ratio control pulse DS is to increase the dividing ratio of frequency divider 10. Thus, the higher frequency reference pulses VN now are divided by the factor 1/(M+1). In the foregoing example, it is assumed that M=14. Hence, variable frequency divider 10 now is controlled to divide the frequency of the higher frequency reference pulses VN by the factor 1/15. This reduces the frequency of frequency-divided reference pulses CM. Servo loop 11 thus drives motor 1 in accordance with this reduced frequency, so as to reduce the speed of the motor. This, in turn, delays the occurrence of position pulse PG relative to the time of occurrence of vertical synchronizing signal VD. That is, and when viewed in FIG. 5F, position pulse a is shifted to the right because of the reduction in speed of motor 1.

Position pulse b, as shown in FIG. 5F, is seen to occur at a time that is closer to vertical synchronizing signal VD than before. Nevertheless, this position pulse occurs during the duration of advanced window pulse WZ. Hence, as before, flip-flop circuit 31 is set to the state determined by this advanced window pulse and in response to the position pulse PG so as to supply the ratio control pulse DS (FIG. 5G) to variable frequency divider 10. Once again, the frequency of higher frequency reference pulses VN is divided by the factor 1/15 for the duration of the ratio control pulse DS. This, in turn, drives motor 1 at a slower speed during this interval. Consequently, the time of occurrence of the position pulse is delayed; and, ultimately, is delayed to the point that it occurs within the duration of desired window pulse WX. At that time, the phase of motor 1, that is, the position of the rotary magnetic head driven thereby, is within its desired range.

Figure 5H:
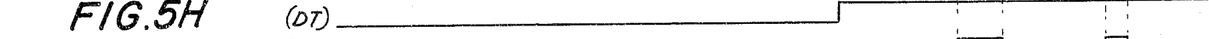
Figure 5I:
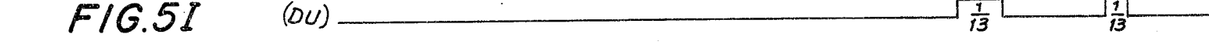

The manner in which window detector 30 operates to adjust the dividing ratio of variable frequency divider 10 so as to modify the operation of motor 1 whereby the proper phase of that motor is attained has been described with reference to the phase-leading occurrence of position pulse PG relative to desired window pulse WX. The manner in which motor 1 is controlled in the event that the position pulse occurs in a phase lagging relationship with respect to the desired window pulse now will be described with reference to FIGS. 5H and 5I. Let it be assumed that position pulse c, shown in FIG. 5F, occurs during the duration of delayed window pulse WY. Flip-flop circuit 32 is set to the state of the delayed window pulse WY in response to this position pulse. Hence, the flip-flop circuit is set to produce the output signal DT, shown in FIG. 5H, at its Q output. This signal DT is supplied to the D input of flip-flop circuit 33, which is responsive to the commencement of the desired window pulse WX so as to be set to the state determined by signal DT. As shown in FIG. 5I, flip-flop circuit 33 produces the ratio control pulse DU at its Q output, and this pulse is supplied to the control input of variable frequency divider 10. As mentioned above, ratio control pulse DU sets the dividing ratio of the frequency divider to the factor 1/(M−1), or 1/13. Hence, the frequency of the frequency-divided reference pulses CM is increased. This, in turn, is used to drive motor 1 at an increased speed. As the speed of the motor is increased, the time of occurrence of the position pulses PG is advanced relative to the desired window pulse WX. That is, and as viewed in FIG. 5F, the position pulses d, e, and so on, are shifted to the left.

Flip-flop circuit 33 is reset in response to the position pulse PG which next occurs during the delayed window pulse WY, this position pulse being identified as position pulse d in FIG. 5F. Hence, ratio control pulse DU terminates in response to position pulse d, as shown in FIG. 5I.

The occurrence of the next position pulse e also is assumed to be delayed relative to the desired window pulse WX. Hence, flip-flop circuit 33 once again is set in response to the commencement of the desired window pulse, and inasmuch as flip-flop circuit 32 had remained in its set state to continue the application of signal DT to flip-flop 33. Consequently, ratio control pulse DU once again is supplied to variable frequency divider 10, this pulse being terminated in response to the occurrence of position pulse e. That is, the duration of ratio control pulse DU extends from the commencement of the desired window pulse WX to the occurrence of the next-following position pulse PG. Once again, ratio control pulse DU reduces the frequency-dividing ratio of divider 10 so as to increase the frequency of frequency-divided reference pulses CM. This, in turn, increases the speed of motor 1 so as to advance the time of occurrence of the position pulse.

Ultimately, position pulse PG will be shifted so as to occur within the duration of desired window pulse WX. At that time, the occurrence of the position pulse PG, as applied to the clock input CK of flip-flop circuit 32, will coincide with the binary "0" level of delayed window pulse WY. This means that flip-flop circuit 32 will be reset so as to terminate signal DT, as shown in FIG. 5H. Nevertheless, and as shown in FIG. 5I, the ratio control pulse DU, albeit very narrow, will have been generated from the commencement of the desired window pulse WX until the occurrence of the position pulse PG.

It is appreciated that the normal dividing ration of frequency divider 10 is equal to 1/14. This normal dividing ratio is increased to the factor 1/15 only during the interval of each ratio control pulse DS, and is reduced to the factor 1/13 only during the interval of each ratio control pulse DU. During those times outside these intervals, the dividing ratio of variable frequency divider 10 returns to its normal factor of 1/14. Hence, the frequency of the frequency-divided reference pulses CM is seen to be reduced or increased only during those brief intervals which coincide with the durations of ratio pulse DS and DU. Nevertheless, such brief modulations in the frequency of frequency-divided reference pulses CM are sufficient to adjust the operation of motor 1 such that the phase thereof becomes equal to a desired phase. That is, these adjustments to the operation of motor 1 are successful in shifting position pulse PG so as to occur within the duration of the desired window pulse WX.

It should be appreciated that, since the frequency of frequency-divided reference pulses CM is equal to the frequency of speed-representing signal FG, the period of pulses CM is equal to the period of speed-representing signal FG, i.e., the pitch of the magnetic teeth of frequency generator 2. The period of frequency-divided reference pulses CM is equal to one-fourteenth the period of higher frequency reference pulses VN. That is, fourteen reference pulses VN can be contained within the period of frequency-divided reference CM. It is recalled that the duration of desired window pulse WX is equal to fourteen higher frequency reference pulses VN. Thus, the duration of desired pulse WX is equal to the period of frequency-divided reference pulses CM which, in turn, is equal to the pitch of the magnetic teeth of frequency generator 2.

Figure 3:
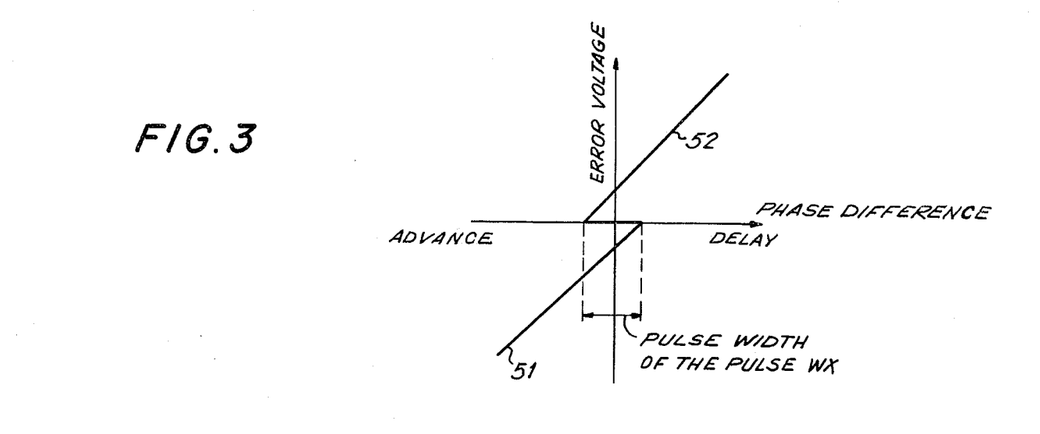
FIG. 3 is a graphical representation of the phase difference between an actual position-representing pulse and a reference position pulse, such as a vertical synchronizing signal, and the error voltage produced by a phase comparator as a result of this phase difference.

It is further appreciated that the duration of ratio control pulses DS and DU is directly related to the phase difference between position pulse PG and desired window pulse WX. As this phase error is reduced, the duration of the respective ratio control pulse likewise is reduced. FIG. 3 is a graphical representation of the phase difference between position pulse PG and desired window pulse WX, and the phase error voltage produced by phase comparator 12. More particularly, curve 51 is a negative voltage produced by comparator 12 to reduce the speed of motor 1 when position pulse PG is in a phase-leading relation with respect to desired window pulse WX. Conversely, curve 52 is a positive voltage produced by comparator 12 to increase the speed of motor 1 when position pulse PG is in a phase-lagging relation with respect to the desired window pulse. It is seen that the error voltage is reduced to zero when the position pulse PG occurs within the duration of the desired window pulse WX.

Figures 6A, 6B:
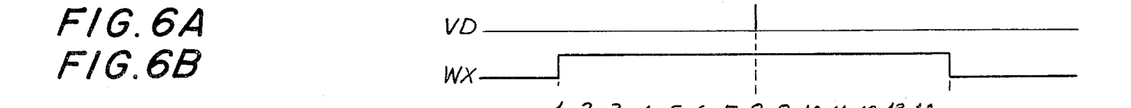
FIGS. 6A-6F are waveform diagrams which are useful in understanding the operation of the embodiment shown in FIG. 2.
Figures 6C, 6D, 6E, 6F:
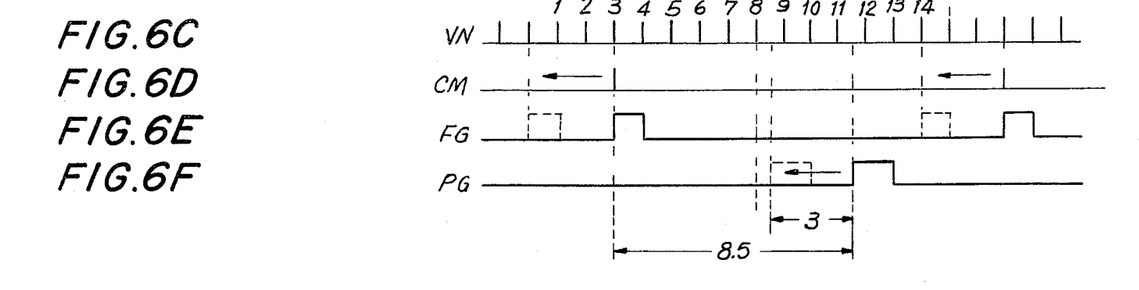
Figure 7A:
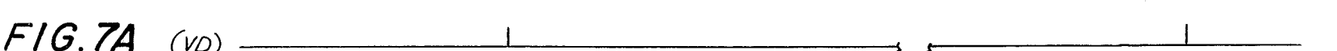
FIGS. 7A-7D are waveform diagrams representing different operations of the embodiment shown in FIG. 2.
Figure 7B:
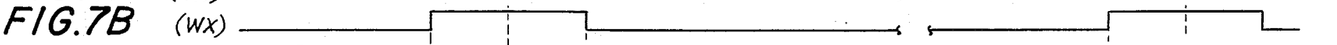
Figure 7C:
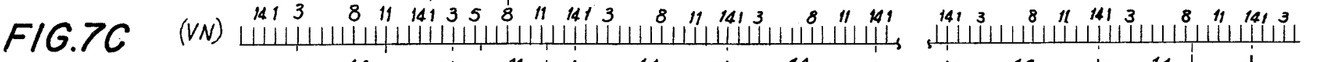
Figure 7D:
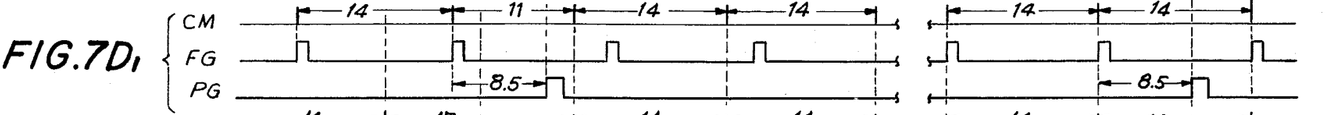
Figure 7D:
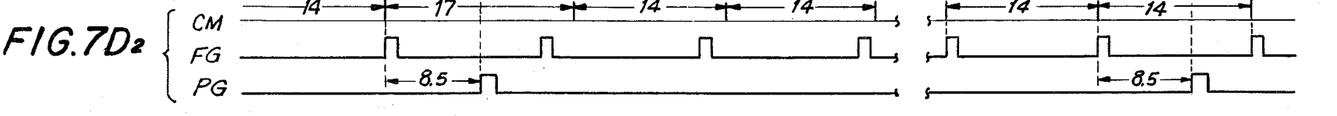

From the foregoing description of the operation of FIG. 1, it is seen that the servo control apparatus illustrated therein is effective to control motor 1 such that its phase, or position, occurs within a desired range. When this apparatus is used in a VTR, the magnetic head is controlled so as to be within a desired range of, for example, the beginning of a record track, at the time of occurrence of the video synchronizing signal. As will now be described, another aspect of this invention is to provide accurate control over motor 1 such that its phase corresponds precisely to a desired phase. Referring to FIGS. 6A-6F, the particular relationship of the various signals used in the servo control apparatus, and discussed in detail above, is recreated. As mentioned previously, the desired window pulse WX, shown in FIG. 6B, is generated so as to be substantially centered on the separated vertical synchronizing signal VD, shown in FIG. 6A. Furthermore, the duration of the desired window pulse WX, is sufficient to contain fourteen higher frequency reference pulses VN, as shown in FIG. 6C. Each of these fourteen higher frequency reference pulses is numbered, for convenience. Still further, since the frequency of the frequency-divided reference pulses CM is equal to the frequency of the speed-representing pulses FG at the time that the phase of motor 1 is within its desired range, these pulses CM and signal FG are synchronized, as shown in FIGS. 6D and 6E. That is, servo loop 11 operates such that frequency-divided reference pulses CM coincide with speed-representing signals FG.

The magnetic element which is included in position pulse generator 3 is located such that position pulse PG, such as at the output of delay circuit 14, occurs within a predetermined time following the occurrence of a speed-representing pulse signal FG. For the purpose of the present discussion, this time interval between the occurrence of the speed-representing pulse signal and the position pulse corresponds to 8.5 higher frequency reference pulses VN. This relationship is shown in FIG. 6F. Thus, motor 1 may be controlled such that when both a frequency-divided pulse CM and a speed-representing pulse signal PG occur at, for example, the third reference pulse VN included in the desired window pulse WX, position pulse PG will occur between the eleventh and twelfth reference pulse. Since vertical synchronizing signal VD occurs at the eighth reference pulse VN, it is seen that, in the example assumed herein, position pulse PG is phase displaced from the vertical synchronizing signal by 3.5 reference pulses. If the phase of motor 1 can be adjusted such that the frequency-divided reference pulses CM and coinciding speed-representing pulse signals FG occur at the location represented by the broken lines in FIGS. 6D and 6E, that is, at the fourteenth higher frequency reference pulse VN, then position pulse PG, which is phase delayed from the speed-representing pulse signal by 8.5 reference pulses VN, will occur between the eighth and ninth reference pulse. This is substantially phase coincident with the vertical synchronizing signal VD.

Figure 2:
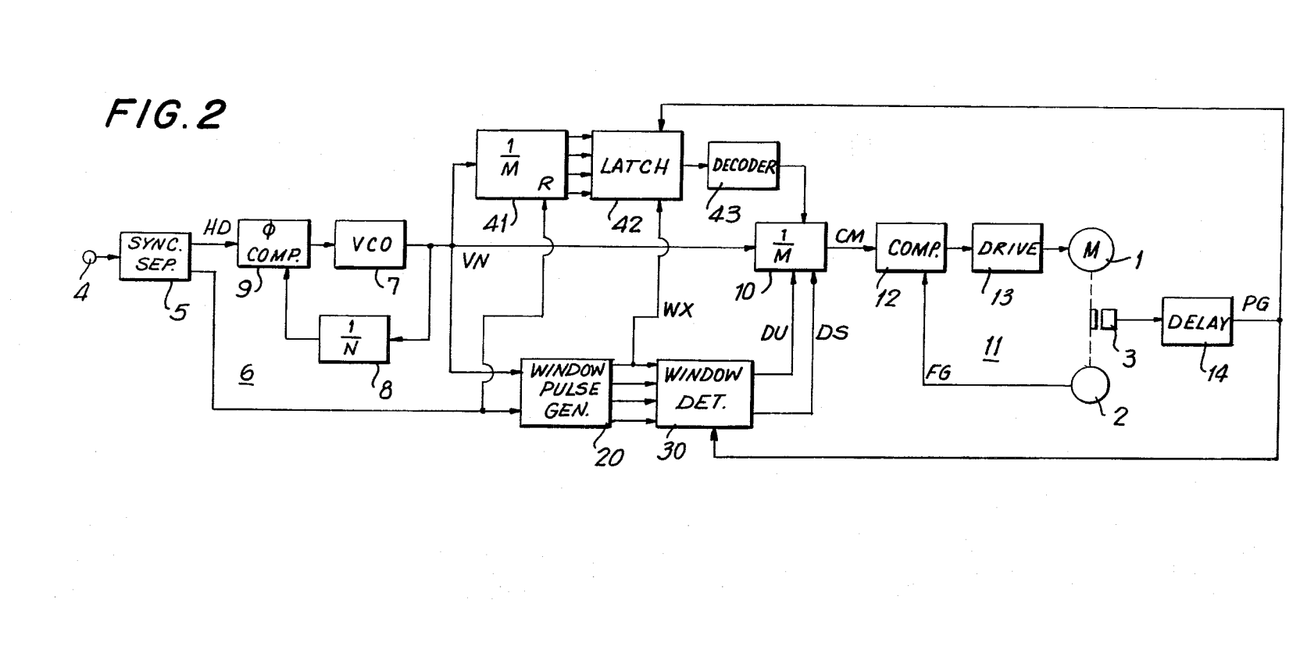
FIG. 2 is a block diagram of an alternative embodiment of this invention.

The foregoing control over the phase of motor 1 such that position pulse PG is adjusted to coincide with vertical synchronizing signal VD is carried out by the embodiment shown in FIG. 2. The servo control apparatus shown in FIG. 2 is substantially similar to that discussed previously with respect to FIG. 1, and like reference numerals are used to identify the same elements. The embodiment of FIG. 2 also includes a phase modulating circuit for modulating the phase of the frequency-divided reference pulses CM produced by variable frequency divider 10. This phase modulating circuit is comprised of a counter 41, a latch circuit 42 and a decoder 43. Counter 41 is coupled to phase locked loop 6 to receive the higher frequency reference pulses VN generated by VCO 7. This counter is adapted to count cyclically to fourteen, the count being incremented in response to each of the higher frequency reference pulses VN. In addition, counter 41 includes a reset terminal connected to synchronizing signal separator 5 to receive the separated vertical synchronizing signal VD. This vertical synchronizing signal is adapted to preset the count of counter 41 to a predetermined count, such as a count of eight. This synchronizes the operation of counter 41 with the operation of window pulse generator 20 (FIG. 1) and insures that the count of this counter will be at the preset count thereof upon the occurrence of the vertical synchronizing signal.

Counter 41 may comprise a conventional digital counting circuit adapted to produce a 4-bit count, this count being supplied, in parallel, to latch circuit 42. The latch circuit includes control inputs connected to window pulse generator 20 and to delay circuit 14, respectively. These control inputs receive the desired window pulse WX from window pulse generator 20 and the position pulse PG from delay circuit 14. Latch circuit 42 is adapted to "latch" or store, the count supplied thereto by counter 41 in response to the occurrence of the desired window pulse WX and the position pulse PG. The latch circuit thus may include conventional storage elements having input gates which are energized, or opened, when the position pulse PG occurs within the duration of the desired window pulse WX. The output of latch circuit 42 is coupled to decoder 43. The decoder may comprise conventional logic circuitry adapted to perform the mathematical function $14+(8-N)$, wherein N is the count stored in latch circuit 42. This decoded function is supplied by decoder 43 to another control input of variable frequency divider 10 so as to vary the frequency dividing ratio of the latter. For example, if decoder 43 produces a decoded output corresponding to the digital count of 11, the dividing ratio of variable frequency divider 10 is changed from its normal dividing ratio 1/14 to the dividing ratio 1/11. Similarly, if decoder 43 produces a decoded output corresponding to the digital count of, for example, 17, the dividing ration of frequency divider 10 is changed from its normal ratio 1/14 to the decoded ratio 1/17.

Latch circuit 42 and decoder 43 are adapted to be reset, or cleared, in response to the termination of the desired window pulse WX.

The manner in which the embodiment shown in FIG. 2 operates now will be described with reference to FIGS. 7A-7D$_2$. It is appreciated that the illustrated servo control apparatus operates in the manner described previously with respect to FIG. 1 in order to control motor 1 such that position pulse PG occurs within the duration of the desired window pulse WX. It is recalled that this represents that the phase of motor 1 is within a desired range. The phase of this motor is controlled by the illustrated phase modulating circuit so as to correspond to a precise, desired phase. The vertical synchronizing signal VD, desired window pulse WX and higher frequency reference pulses VN, discussed in detail above, are presented again in FIGS. 7A, 7B and 7C, respectively. Let it be assumed that the position pulse PG occurs during the latter half portion of the desired window pulse WX, as represented by the position pulses PG of FIG. 7D$_1$. Counter 41 counts the higher frequency reference pulses VN generated by VCO 7. This counter counts from 1 to 14, and then is recycled. This operation of the counter is synchronized with the generation of desired window pulse WX by resetting the count of counter 41 to a count of 8 in response to each vertical synchronizing signal VD.

When position pulse PG occurs within the duration of desired window pulse WX, the count then reached by counter 41 is latched in latch circuit 42. In the example described with respect to FIG. 7D$_1$, it is assumed that counter 41 has reached a count of 11 at the time that position pulse PG occurs. Hence, latch circuit 42 latches this count of 11 therein. Decoder 43 performs the function of $14+(8-11)=11$; and supplies this decoded signal as a ratio control pulse to frequency divider 10. The dividing ratio of variable frequency divider 10 thus is changed for one dividing cycle thereof from a dividing ratio of 1/14 to a dividing ratio of 1/11. The resultant brief change in the frequency of frequency-divided reference pulses CM results in a phase shift of these pulses, as shown in FIG. 7D$_1$. Servo loop 11 now drives motor 1 such that speed-representing pulse signals FG tend to coincide with the phase-shifted frequency-divided reference pulses CM. Of course, as the speed-representing pulse signal is phase adjusted, the position pulse PG, which occurs at a time delayed by 8.5 reference pulses VN from pulse signal FG, likewise is phase adjusted. It is seen that, initially, position pulse PG occurs between the eleventh and twelfth higher frequency reference pulses VN. This corresponds with the occurrence of frequency-divided reference pulse CM and speed-representing pulse signal FG at the third higher frequency reference pulse. Decoder 43 operates variable frequency divider 10 so as to, effectively, shift the time of occurrence of the frequency-divided reference pulses CM to occur at the fourteenth higher frequency reference pulse VN. Servo loop 11 drives motor 1 such that speed-representing pulse signals FG likewise occur at the fourteenth higher frequency reference pulse, as shown at the right-hand portion of FIG. 7D$_1$. When the speed-representing pulse signal FG occurs at the fourteenth higher frequency reference pulse, position pulse PG, which is delayed by 8.5 higher frequency reference pulses, occurs between the eighth and ninth reference pulse VN. This is in substantial phase coincidence with vertical synchronizing signal VD. Hence, the phase modulating circuit adjusts the phase of frequency-divided reference pulses CM so as to drive motor 1 to its precise, desired phase.

Now, let it be assumed that position pulse PG occurs during the first half portion of desired window pulse WX, as shown in FIG. 7D$_2$. It is assumed herein that position pulse PG occurs between the fifth and sixth higher frequency reference pulses VN. Since position pulse PG is delayed from speed-representing pulse signal FG by 8.5 of these higher frequency reference pulses VN, it is seen that the speed-representing pulse signal, which is synchronized with the frequency-divided pulses CM, occurs in coincidence with the eleventh higher frequency reference pulse VN.

As before, counter 41 counts the higher frequency reference pulses VN supplied thereto by VCO 7. At the time of occurrence of the position pulse PG (within, of course, the duration of the desired window pulse WX), latch circuit 42 latches the count reached by counter 41. It is appreciated that latch circuit 42 now latches a count of 5. Decoder 43 performs the mathematical function of $14+(8-5)$ so as to supply the decoded count of 17 to variable frequency divider 10. This decoded count functions as a ratio control pulse to change the frequency-dividing ratio of frequency divider 10 from its normal ratio of 1/14 to the ratio 1/17, as determined by decoder 43. This change in the frequency dividing ratio is carried out for only one cycle of variable frequency divider 10.

From FIG. 7D$_2$, it is seen that this change in the dividing ratio of frequency divider 10 delays the occurrence of the next frequency-divided reference pulse CM from its normal time of occurrence at the eleventh higher frequency reference pulse VN to the new time of occurrence of the fourteenth higher frequency reference pulse. As before, servo loop 11 drives motor 1 in response to these phase-shifted frequency-divided reference pulses CM such that the phase of motor 1 is varied until the speed-representing pulse signals FG coincide with the frequency-divided reference pulses CM, as shown at the right-hand portion of FIG. 7D$_2$. When speed-representing reference pulses FG occur at the fourteenth higher frequency reference pulse VN, the position pulse PG, which is displaced from the speed-representing pulse signal by 8.5 of the higher frequency reference pulses, now occurs between the eighth and ninth higher frequency reference pulses. This is in substantial coincidence with the vertical synchronizing signal VD.

Thus, it is seen that the embodiment illustrated in FIG. 2 serves to adjust the phase of motor 1, and more specifically, the member which is driven by motor 1, such that the phase, or position, of that member is in precise synchronism with the vertical synchronizing signal VD.

While the present invention has been particularly shown and described with reference to certain preferred embodiments, it should be readily apparent to those of ordinary skill in the art that various changes and modifications in form and details can be made without departing from the spirit and scope of the invention. For example, the servo control apparatus disclosed herein can be used in a VTR, for example, to control either the rotation of the magnetic head or, alternatively, the movement of the magnetic tape. In the latter environment, motor 1 is used to drive the capstan which, in turn, drives the tape. Position pulse PG will, in that environment, be reproduced from the usual control pulse track that is recorded on such a tape. The servo control apparatus nevertheless will control motor 1 such that the tape driven thereby is at its proper phase, or position, at the time of occurrence of the vertical synchronizing signal. Indeed, the present invention need not be limited solely to video signal recording or reproducing applications. The present invention can be used readily to control the phase of other driven members. It is, therefore, intended that the appended claims be interpreted as including all such changes and modifications.

What is claimed is:

1. Servo control apparatus for controlling a driven member, comprising a source of reference signals having a frequency determinative of the speed at which said member is driven;

means for deriving signals representing the actual speed at which said member is driven;

a servo loop responsive to said reference signals and to the speed representing signals for driving said member at a speed determined by the frequency of said reference signals;

means for deriving signals representing the actual position of said driven member;

window pulse generating means for generating window pulses corresponding to desired positions of said driven member;

means for detecting when the position representing signals occur within the duration of said window pulses;

modulating means for modulating the frequency of said reference signals if said position representing signals occur outside said duration of said window pulses, to adjust the speed and position of said driven member until said member is driven such that the actual positions thereof correspond to said desired positions; and phase modulating means for modulating said reference signals to adjust the position of said driven member such that said position pulse occurs at a predetermined location within said window pulse.

2. In a video signal recording/reproducing system, servo control apparatus for controlling the speed and phase of a driven member in synchronism with the horizontal and vertical sychronizing signals, respectively, of a video signal, comprising controllable oscillator means for generating relatively higher frequency pulses synchronized with said horizontal synchronizing signal;

controllable frequency divider means coupled to said controllable oscillator means for dividing the frequency of said higher frequency pulses;

means for deriving speed representing signals having a frequency representing the actual speed of said driven member;

speed control means, including phase comparator means for comparing the phase of the frequency-divided pulses produced by said frequency divider means to the phase of said speed representing signals, to control the speed of said driven member such that said frequency-divided pulses and said speed representing signals are in phase synchronism;

means for producing a position pulse when said member is driven to a predetermined position, such that said position pulse represents the actual position of said member;

window pulse generating means responsive to said vertical synchronizing signal to generate a desired window pulse, an advanced window pulse, and a delayed window pulse, including means for determining the approximate mid-point between adjacent vertical synchronizing signals and to generate said desired window pulse substantially centered on a vertical synchronizing signal, said advanced window pulse extending from said determined mid-point to said desired window pulse, and said delayed window pulse extending from said desired window pulse to said determined mid-point; and divider control means coupled to said window pulse generating means and responsive to said position pulse to sense whether said position pulse occurs within said desired window pulse and to increase or decrease the dividing ratio of said controllable frequency divider means if said position pulse occurs in advance of or delayed from said desired window pulse, respectively, whereby the speed of said driven member is reduced or increased, respectively, so as to correspondingly shift the phase of said driven member.

3. The servo control apparatus of claim 2 wherein said divider control means comprises increase control means for supplying an increase ratio pulse to said controllable frequency divider means having a duration extending from the occurrence of said position pulse to the termination of said desired window pulse, if said position pulse occurs during said advanced window pulse, to increase said dividing ratio from a normal ratio by a constant, predetermined amount during the duration of said increase ratio pulse; and decrease control means for supplying a decrease ratio pulse to said controllable frequency divider means having a duration extending from the commencement of said desired window pulse to the occurrence of said position pulse, if said position pulse occurs during said delayed window pulse, to decrease said dividing ratio from said normal ratio by a constant, predetermined amount during the duration of said decrease ratio pulse.

4. Servo control apparatus for controlling a driven member, comprising a source of reference signals having a frequency determinative of the speed at which said member is driven;

means for deriving signals representing the actual speed at which said member is driven;

a servo loop responsive to said reference signals and to the speed representing signals for driving said member at a speed determined by the frequency of said reference signals;

means for deriving signals representing the actual position of said driven member;

window pulse generating means for generating window pulses corresponding to desired positions of said driven member, including advanced window generating means for generating a phase advanced window pulse, delayed window generating means for generating a phase delayed window pulse, and desired window generating means for generating a desired window pulse separating said phase advanced window pulse from said phase delayed window pulse;

means for detecting when said position representing signals occur within the duration of said phase advanced window pulse to produce a frequency reducing signal, when said position representing signals occur within the duration of said phase delayed window pulse to produce a frequency increasing signal, and when said position representing signals occur within the duration of said desired window pulse to produce a normal signal; and modulating means for modulating the frequency of said reference signals if said position representing signals occur outside said duration of said desired window pulses, to adjust the speed and position of said driven member until said member is driven such that the actual positions thereof correspond to said desired positions.

5. The apparatus of claim 4, wherein said modulating means includes means for supplying pulses at a substantially constant, higher frequency; and frequency divider means for normally dividing the frequency of said supplied pulses by one factor when said position representing signals occur within the duration of said desired window pulses and for dividing the frequency of said supplied pulses by a different factor when said position representing signals occur outside said duration of said desired window pulses, the divided pulses produced by said frequency divider means being used as said reference signals.

6. The apparatus of claim 5 wherein said frequency divider means is responsive to said normal signal to divide the frequency of said supplied pulses by a normal factor, whereby said reference signals have a normal frequency to cause said servo loop to drive said member at a normal speed; said frequency divider means is responsive to said frequency reducing signal to divide the frequency of said supplied pulses by a higher than normal factor, whereby said reference signals have a less than normal frequency to cause said servo loop to drive said member at a slower than normal speed so as to retard the occurrence of said position representing signals to within the duration of said desired window pulse; and said frequency divider means is responsive to said frequency increasing signal to divide the frequency of said supplied pulses by a lower than normal factor, whereby said reference signals have a greater than normal frequency to cause said servo loop to drive said member at a faster than normal speed so as to advance the occurrence of said position representing signals to within the duration of said desired window pulse.

7. In a video signal recording/reproducing system, servo control apparatus for controlling the speed and phase of a driven member in synchronism with the horizontal and vertical synchronizing signals, respectively, of a video signal, comprising:

controllable oscillator means for generating relatively higher frequency pulses synchronized with said horizontal synchronizing signal;

controllable frequency divider means coupled to said controllable oscillator means for dividing the frequency of said higher frequency pulses;

means for deriving speed representing signals having a frequency representing the actual speed of said driven member;

speed control means, including phase comparator means for comparing the phase of the frequency-divided pulses produced by said frequency divider means to the phase of said speed representing signals, to control the speed of said driven member such that said frequency-divided pulses and said speed representing signals are in phase synchronism;

means for producing a position pulse when said member is driven to a predetermined position, such that said position pulse represents the actual position of said member;

window pulse generating means responsive to said vertical synchronizing signal to generate a window pulse having a center portion that substantially coincides with said vertical synchronizing signal; and divider control means coupled to said window pulse generating means and responsive to said position pulse to sense whether said position pulse occurs within said window pulse and to increase or decrease the dividing ratio of said controllable frequency divider means if said position pulse occurs in advance of or delayed from said window pulse, respectively, whereby the speed of said driven member is reduced or increased, respectively, so as to correspondingly shift the phase of said driven member.

8. The servo control apparatus of claim 7 further comprising phase control means for controlling the phase of the frequency-divided pulses produced by said frequency divider means during said window pulse so as to adjust the phase of said position pulse.

9. The servo control apparatus of claim 8 wherein said phase control means comprises counting means for counting the higher frequency pulses generated by said controllable oscillator means during each said window pulse; detecting means for detecting the count of said counting means at the time of occurrence of said position pulse during each said window pulse; and means for changing the dividing ratio of said controllable frequency divider means in accordance with said count, if said count differs from a predetermined count.

10. The servo control apparatus of claim 9 wherein said means for changing the dividing ratio is operative once during each window pulse.

11. Servo control apparatus for controlling a driven member, comprising:

a source of reference signals having a frequency determinative of the speed at which said member is driven;

means for deriving signals representing the actual speed at which said member is driven;

a servo loop responsive to said reference signals and to the speed representing signals for driving said member at a speed determined by the frequency of said reference signals;

means for deriving signals representing the actual position of said driven member;

window pulse generating means for generating window pulses corresponding to desired positions of said driven member;

means for detecting when the position representing signals occur within the duration of said window pulses; and modulating means for modulating the frequency of said reference signals if said position representing signals occur outside said duration of said window pulses, to adjust the speed and position of said driven member until said member is driven such that the actual positions thereof correspond to said desired positions.

12. The apparatus of claim 11 wherein said modulating means comprises means for supplying pulses at a substantially constant, higher frequency; and frequency divider means for normally dividing the frequency of said supplied pulses by one factor when said position representing signals occur within the duration of said window pulses and for dividing the frequency of said supplied pulses by a different factor when said position representing signals occur outside said duration of said window pulses, the divided pulses produced by said frequency divider means being used as said reference signals.

13. The apparatus of claim 12 wherein said speed representing signals are pulse signals having a frequency corresponding to the actual speed of said member; and wherein said servo loop comprises a phase comparator for comparing the phase of said speed representing pulse signals to the phase of the frequency divided pulse signals, and means for changing the speed at which said member is driven in accordance with the phase comparison.

14. The apparatus of claim 12 or 13 wherein said source of reference signals comprises a controllable oscillator for supplying said pulses at said higher frequency; means for providing synchronizing pulses; and a phase-locked loop for synchronizing said controllable oscillator to said synchronizing pulses.

15. The apparatus of claim 11 wherein said driven member comprises a motor driven rotary transducer for recording and/or reproducing video signals; and said means for deriving position representing signals comprises sensing means for sensing when said transducer rotates to a predetermined position and for generating a position pulse.

16. The apparatus of claim 11 wherein said driven member comprises a magnetic medium for recording and/or reproducing video signals, said magnetic medium having periodic control signals recorded thereon; and said means for deriving position representing signals comprises a sensing transducer for reproducing each control signal as a position pulse.

17. The apparatus of claim 15 or 16 wherein said source of reference signals comprises synchronizing separator means for separating the horizontal and vertical synchronizing signals included in said video signals.

18. The apparatus of claim 17 wherein said window pulse generating means comprises desired window generating means for generating a desired window pulse that is substantially centered with respect to a vertical synchronizing signal; advanced window generating means for generating an advanced window pulse commencing substantially midway between two successive vertical synchronizing signals and terminating at the commencement of said desired window pulse; and delayed window generating means for generating a delayed window pulse commencing at the termination of said desired window pulse and terminating at the commencement of said advanced window pulse.

19. Servo control apparatus for controlling a driven member by which video signals are recorded and/or reproduced, comprising a source of reference signals having a frequency determinative of the speed at which said member is driven, said source including synchronizing signal separator means for separating the horizontal and vertical synchronizing signals included in said video signals;

means for deriving signals representing the actual speed at which said member is driven;

a servo loop responsive to said reference signals and to the speed representing signals for driving said member at a speed determined by the frequency of said reference signals;

sensor means for sensing when said member arrives at a predetermined position and thereby providing position pulses representing the actual position of said driven member;

window pulse generating means for generating window pulses corresponding to desired positions of said driven member, including desired window generating means for generating a desired window pulse that is substantially centered with respect to a vertical synchronizing signal; advanced window generating means for generating an advanced window pulse commencing substantially midway between two successive vertical synchronizing signals and terminating at the commencement of said desired window pulse; and delayed window generating means for generating a delayed window pulse commencing at the termination of said desired window pulse and terminating at the commencement of said advanced window pulse;

means for detecting when the position representing signals occur within the duration of said window pulses; and modulating means for modulating the frequency of said reference signals if said position pulses occur outside said duration of said desired window pulses, to adjust the speed and position of said driven member until said member is driven such that the actual positions thereof correspond to said desired positions, said modulating means including pulse generating means for generating a train of pulses synchronized with said horizontal synchronizing signals and variable frequency divider means for dividing the frequency of said train of pulses by a predetermined factor when said position pulse occurs within said desired window pulse, for dividing the frequency of said train of pulses by a higher predetermined factor when said position pulse occurs within said advanced window pulse, and for dividing the frequency of said train of pulses by a lower predetermined factor when said position pulse occurs within said delayed window pulse, the frequency-divided train of pulses being applied to said servo loop.

20. The apparatus of claim 19 wherein said desired window pulse generating means comprises bistate means; first counting means reset to an initial count by said vertical synchronizing signal for counting the pulses included in said generated train of pulses to produce a set signal when a first predetermined count is reached; and second counting means reset by said vertical synchronizing signal for counting the pulses included in said generated train of pulses to produce a reset signal when a second predetermined count is reached; said bistate means being set to a first state by said set signal and being reset to a second state by said reset signal.

21. The apparatus of claim 20 wherein said advanced window generating means comprises second bistate means; additional counting means reset to an initial count by said vertical synchronizing signal for counting the pulses included in said generated train of pulses to produce a reset signal when a predetermined count is reached substantially midway between successive vertical synchronizing signals, said second bistate means being reset to a first state by the reset signal produced by said additional counting means and being set to a second state by said vertical synchronizing signal; and gate means for producing said advanced window pulse when said second bistate means is in its first state and the first-mentioned bistate means is in its second state.

22. The apparatus of claim 21 wherein said delayed window generating means comprises additional gate means for producing said delayed window pulse when said second bistate means is in its second state and said first-mentioned bistate means is in its second state.

23. The apparatus of claim 19 wherein said means for detecting comprises first divider control means for producing a first control pulse to cause said variable frequency divider means to divide the frequency of said train of pulses by said higher predetermined factor, said first control pulse commencing upon the occurrence of said position pulse within said advanced window pulse and terminating in response to the termination of said desired window pulse; and second divider control means for producing a second control pulse to cause said variable frequency divider means to divide the frequency of said train of pulses by said lower predetermined factor, said second control pulse commencing in response to the commencement of said desired window pulse if said position pulse has occurred within said delayed window pulse and terminating in response to the next occurrence of said position pulse.

24. The apparatus of claim 23 wherein said first divider control means comprises first bistate means being set to a first state during said advanced window pulse and in response to the occurrence of said position pulse, and being reset to a second state in response to the termination of said desired window pulse, said first control pulse being derived from said first state of said first bistate means.

25. The apparatus of claim 24 wherein said second divider control means comprises second bistate means being set to the same state as said delayed window pulse and in response to said position pulse; and third bistate means being set to a first state by a first state of said second bistate means and in response to the commencement of said desired window pulse, and being reset to a second state by said position pulse, said second control pulse being derived from said first state of said third bistate means.

26. The apparatus of claim 19 further comprising sensing means for sensing the relative location within said desired window pulse at which said position pulse occurs; and means for temporarily adjusting the factor by which said variable frequency divider means divides the frequency of said train of pulses as a function of said sensed relative location of said position pulse, whereby the driving of said member is temporarily adjusted to shift the occurrence of said position pulse to a predetermined location within said desired window pulse.

27. The apparatus of claim 26 wherein said sensing means comprises counting means for counting the number of pulses included in said train of pulses during the duration of said desired window pulse until the occurrence of said position pulse; and temporary storage means for storing the count obtained by said counting means.

28. The apparatus of claim 27 wherein said means for temporarily adjusting comprises decoding means for decoding the temporarily stored count and applying the decoded count to said variable frequency divider means, whereby the factor by which said variable frequency divider means divides the frequency of said train of pulses is changed in accordance with said decoded count so as to adjust the phase of said reference signals and, thus, the phase of said driven member.

* * * * *